(12) United States Patent
Huh et al.

(10) Patent No.: US 7,505,417 B2
(45) Date of Patent: Mar. 17, 2009

(54) METHOD AND APPARATUS FOR CONTROLLING PACKET TRANSMISSION IN A MOBILE TELECOMMUNICATION SYSTEM

(75) Inventors: Hoon Huh, Daejeon-Kwangyok-shi (KR); Yu-Suk Yun, Seoul (KR); Soon-Young Yoon, Seoul (KR); Jae-Heung Yeom, Seoul (KR); Sang-Hyun Yang, Seoul (KR); Hee-Won Kang, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 800 days.

(21) Appl. No.: 09/892,973

(22) Filed: Jun. 27, 2001

(65) Prior Publication Data

US 2002/0018446 A1 Feb. 14, 2002

(30) Foreign Application Priority Data

Jun. 27, 2000 (KR) ............................ 2000-35793

(51) Int. Cl.
*H04L 1/00* (2006.01)
(52) U.S. Cl. .................. 370/245; 370/252; 370/332; 455/69; 455/277.2; 455/522
(58) Field of Classification Search .............. 370/347, 370/337, 442, 331, 332, 333, 335, 341, 342, 370/458, 252, 253, 232, 245
See application file for complete search history.

(56) References Cited

U.S. PATENT DOCUMENTS

| | | | | |
|---|---|---|---|---|
| 5,287,544 A | * | 2/1994 | Menich et al. | 455/450 |
| 5,561,841 A | * | 10/1996 | Markus | 455/446 |
| 5,995,496 A | * | 11/1999 | Honkasalo et al. | 370/318 |
| 5,999,979 A | | 12/1999 | Vellanki et al. | 709/232 |
| 6,134,220 A | * | 10/2000 | Le Strat et al. | 370/252 |
| 6,289,003 B1 | * | 9/2001 | Raitola et al. | 370/278 |
| 6,298,233 B1 | * | 10/2001 | Souissi et al. | 455/423 |
| 6,317,418 B1 | * | 11/2001 | Raitola et al. | 370/278 |

(Continued)

FOREIGN PATENT DOCUMENTS

JP 08-242486 9/1996

(Continued)

OTHER PUBLICATIONS

A. Jalali et al., "Data Throughput of CDMA-HDR a High Efficiency-High Data Rate Personal Communication Wireless System", 2000 IEEE 51st Vehicular Technology Conference, 2000.

*Primary Examiner*—Chi H. Pham
*Assistant Examiner*—Shick Hom
(74) *Attorney, Agent, or Firm*—The Farrell Law Firm P.C.

(57) ABSTRACT

A method of adapting a mobile telecommunication system to channel conditions. To control transmission of a data packet from an access network (AN) in both a link adaptation scheme and an ARQ (Automatic Repeat reQuest) scheme, an access terminal (AT) compares the received power of a forward pilot signal received from the AN with a predetermined first threshold, checks errors in the data packet of a received time slot if the reception power is greater than the first threshold, and transmits a signal requesting termination of retransmission of the data packet to the AN if no errors are found in the data packet after decoding.

40 Claims, 8 Drawing Sheets

U.S. PATENT DOCUMENTS

| | | | |
|---|---|---|---|
| 6,425,105 B1 * | 7/2002 | Piirainen et al. | 714/748 |
| 6,542,742 B2 * | 4/2003 | Schramm et al. | 455/436 |
| 6,574,211 B2 * | 6/2003 | Padovani et al. | 370/347 |
| 6,708,040 B1 * | 3/2004 | Laroia et al. | 455/515 |
| 6,711,415 B1 * | 3/2004 | McCarthy | 455/522 |
| 2003/0063583 A1 * | 4/2003 | Padovani et al. | 370/329 |
| 2003/0123425 A1 * | 7/2003 | Walton et al. | 370/341 |

FOREIGN PATENT DOCUMENTS

| | | |
|---|---|---|
| JP | 2000-174697 | 6/2000 |
| WO | WO 99/23844 | 5/1999 |
| WO | WO 00/21320 | 4/2000 |

* cited by examiner

METHOD AND APPARATUS FOR CONTROLLING PACKET TRANSMISSION IN A MOBILE TELECOMMUNICATION SYSTEM

PRIORITY

This application claims priority to an application entitled "Method and Apparatus for Requesting Selective Packet Retransmission in Mobile Telecommunication System" filed in the Korean Industrial Property Office on Jun. 27, 2000 and assigned Ser. No. 2000-35793, the contents of which are hereby incorporated by reference.

BACKGROUND OF THE INVENTION

1. Field of the Invention

The present invention relates generally to a method and apparatus for transmitting packets in a mobile telecommunication system, and in particular, to a method and apparatus for controlling transmission of data packets from an AN (Access Network) according to forward channel conditions by an AT (Access Terminal) in both a link adaptation scheme and an ARQ (Automatic Repeat reQuest) scheme.

2. Description of the Related Art

Mobile telecommunication systems typically include ATs and ANs. As a result of attenuation variations along a propagation path, severe inter-system interference, and fading according to a path distance and shadowing, the carrier-to-interference ratio (C/I) of a radio channel may significantly change depending on channel conditions. Link adaptation is a scheme of adapting a data rate to channel conditions such as received C/I in order to increase channel throughput. In the link adaptation scheme, the data rate is determined according to a code rate and a modulation. A link adaptation system increases a data rate by means of high code rate codes and high-level modulation when a received C/I is high. If the received C/I is low, the link adaptation system decreases the data rate by means of low code rate codes and low level modulation and retransmits packets selectively to thereby increase channel reliability.

In an HDR (High Data Rate) system standardized by the 3GPP2 ($3^{rd}$ Generation Partnership Project 2), physical layers using link adaptation on the forward link can be transmitted in 13 ways according to three modulation schemes, QPSK (Quadrature Phase Shift Keying), 8PSK (8-ary Phase Shift Keying), and 16QAM (16-ary Quadrature Amplitude Modulation), three code rates, $1/4$, $3/8$ and $1/2$, and the number of slots in which a packet is repeatedly transmitted.

FIG. 1 illustrates HDR forward and reverse links. Referring to FIG. 1, an HDR packet includes 2048 chips per slot and a pilot channel in each half slot is assigned to 96 chips. Since the pilot channel is transmitted with the same power as that of a traffic channel, the C/I of the pilot channel is equal to that of the traffic channel. The pilot C/I becomes a criterion by which a code rate and modulation are determined.

FIG. 2 is a flowchart illustrating a packet transmission requesting procedure in a conventional HDR system. Referring to FIG. 2, upon receipt of a packet in each slot, an AT analyzes the preamble of the packet, checks whether the packet is destined for the AT, and if it is, checks whether an AN transmitted the packet at a data rate requested by the AT by detecting the length of the preamble in step S110. The AT measures the received C/I of a pilot signal in the packet in step S120 and determines a data rate corresponding to the received C/I in step S130. The AT feeds back information about the determined data rate in step S140. Here, the data rate information is called DRC (Data Rate Control) information, which is transmitted in each slot on a reverse DRC channel as shown in FIG. 1.

If the determined data rate is low, the AN transmits the packet repeatedly to ensure channel reliability. FIG. 3 illustrates packet lengths versus data rates on the HDR forward link. Referring to FIG. 3, the same packet is transmitted 16 times at 38.4 kbps and 8 times at 76.8 kbps. The packet is transmitted once at a high data rate of from 614.4 through 2457.6 kbps.

Despite the advantage of increased channel reliability, the repeated transmission of one packet results in the increase of channel estimation errors, slow adaptation of a code rate and modulation to channel changes, and dissipation of radio resources because one packet occupies a long slot period. In addition, since the HDR forward link is subject to TDM (Time Division Multiplexing) between users, if the users occupy many time slots at low data rates, the overall throughput is reduced.

On the other hand, in the case of ARQ, the AT performs a CRC (Cyclic Redundancy Code) check on a received packet and requests packet retransmission to the AN only if the packet has errors. Therefore, a data rate is virtually decreased and channel reliability is increased. In an advanced hybrid ARQ scheme, packet reliability is further increased by reducing a code rate in packet retransmission using error correction codes or by decoding packets of the same sequence number in combination.

FIG. 4 is a flowchart illustrating a packet retransmission requesting procedure in a conventional hybrid ARQ (HARQ) system. Referring to FIG. 4, an AT receives a packet in step S210 and accumulates packet symbols by combining the received packet with previously received packets of the same sequence number in step S220. The AT decodes the packet symbols and performs a CRC check in step S230 and determines whether CRC errors exist in step S240. If no CRC errors are found, the AT transmits an ACK (Acknowledgment) signal to an AN and the decoded data to an upper layer in step S250. The decoded data is processed in the upper layer and the accumulated symbols are discarded in step S260. On the other hand, if CRC errors are found, the AT requests retransmission of the same packet to the AN in step S245.

As described above, the CRC check is performed after decoding a received packet in ARQ. If a channel condition is very bad, errors will be detected continuously in the CRC check and retransmission will be requested continuously. Therefore, much power is dissipated for repeated decoding and a feedback delay is prolonged as much time as required for the decoding. This implies that the AT needs a memory of capacity large enough to store many packets.

Link adaptation and ARQ increase channel throughput by adapting a transmission scheme and the number of transmission times to channel conditions. Yet, the former may decrease the throughput by repeated packet transmission, whereas the latter has the problems of power dissipation, increased delay time, and the requirement of a large capacity memory.

SUMMARY OF THE INVENTION

It is, therefore, an object of the present invention to provide a method and apparatus for increasing a channel adaptation speed and as a result, increasing throughput in both a link adaptation and an ARQ mobile telecommunication system.

Another object of the present invention is to provide a method and apparatus for checking packet errors after determining whether decoding should be performed or not in link adaptation and ARQ.

A further object of the present invention is to provide a method and apparatus for determining whether a packet is to be retransmitted according to a received C/I measurement in link adaptation and ARQ.

Still another object of the present invention is to provide a method and apparatus for determining whether a packet is to be decoded according to a received C/I measurement in link adaptation and ARQ.

The foregoing and other objects of the present invention can be achieved by a method of adapting a mobile telecommunication system to channel conditions. To control transmission of a data packet from an AN in both a link adaptation scheme and an ARQ scheme, an access terminal (AT) compares the received C/I of a forward pilot signal received from the AN with a predetermined first threshold, checks errors in the data packet of a received time slot if the received C/I is greater than the first threshold, and transmits a signal requesting termination of retransmission of the data packet to the AN if no errors are found in the data packet after decoding.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Terms used herein will first be defined.

ACK: a signal requesting discontinuation of retransmission of a packet if a received packet has no errors;

NACK: a signal requesting discontinuation of retransmission of a packet if errors are sure to be generated in the packet even if it is retransmitted;

Current packet: a packet with a sequence number to be received at the present time; and Identical packets: packets with the same sequence number.

Figure 1:
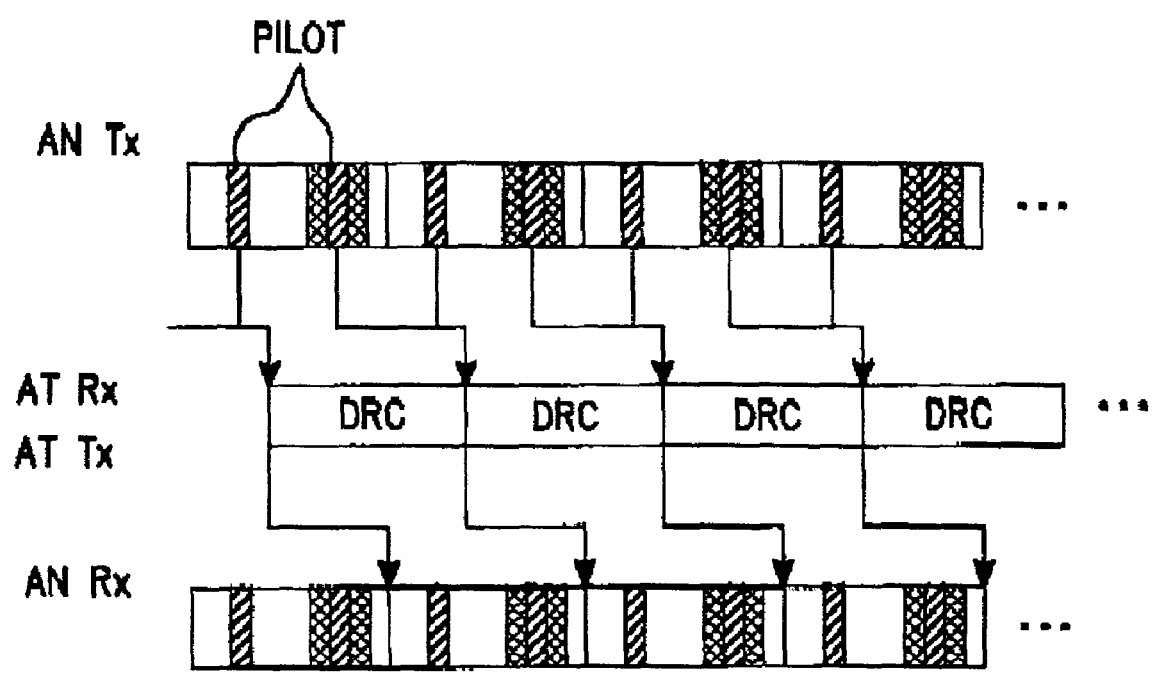
FIG. 1 illustrates HDR forward and reverse links.
Figure 2:
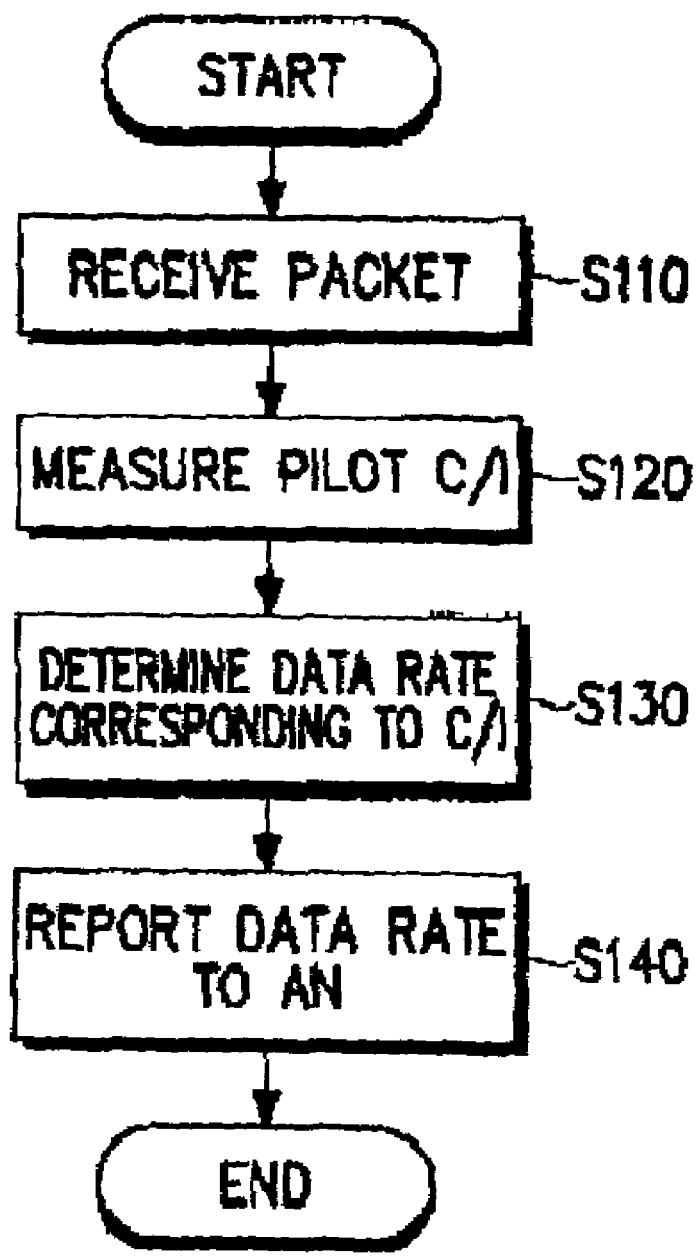
FIG. 2 is a flowchart illustrating a packet retransmission requesting procedure in a conventional HDR system.
Figure 3:
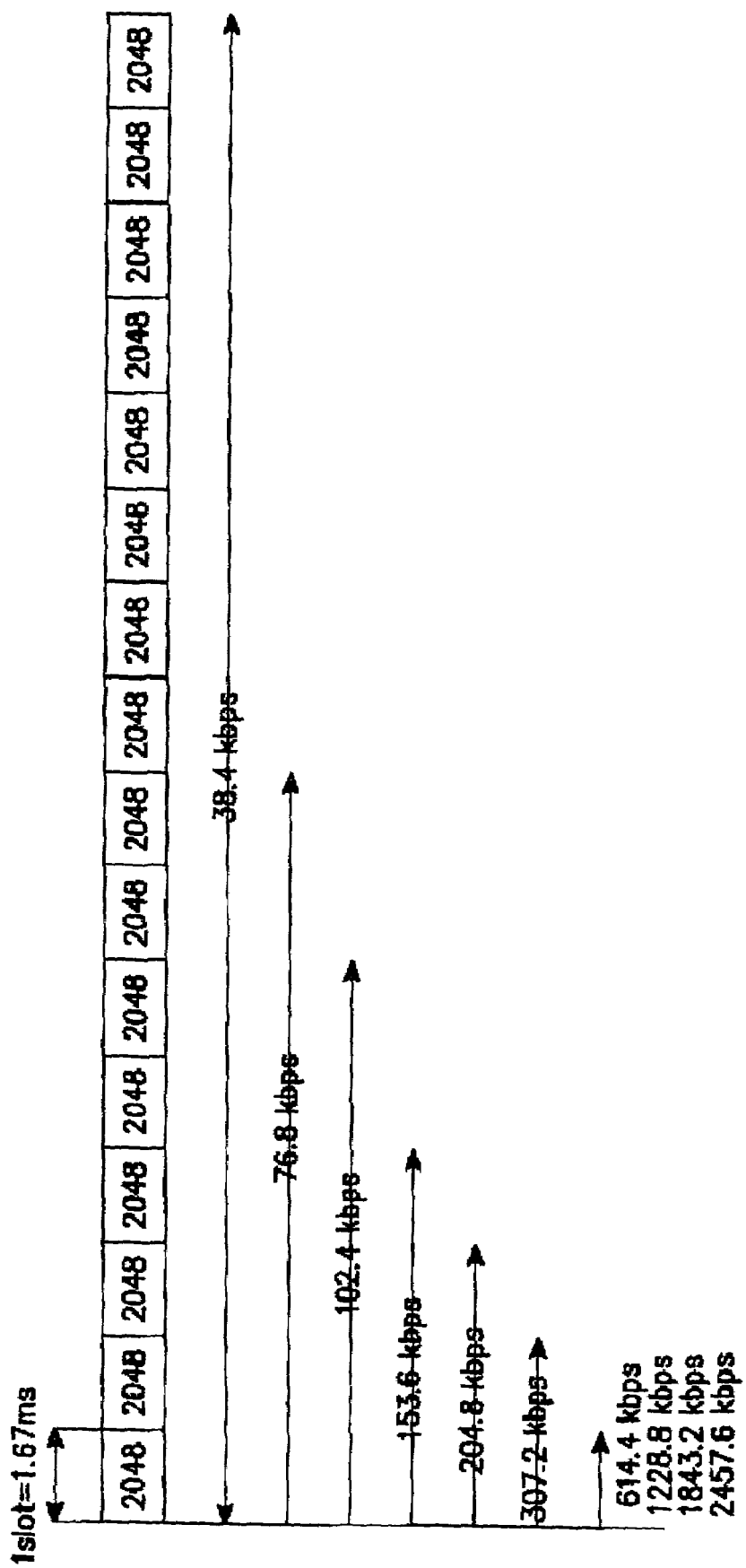
FIG. 3 illustrates packet transmission according to HDR forward data rates.
Figure 4:
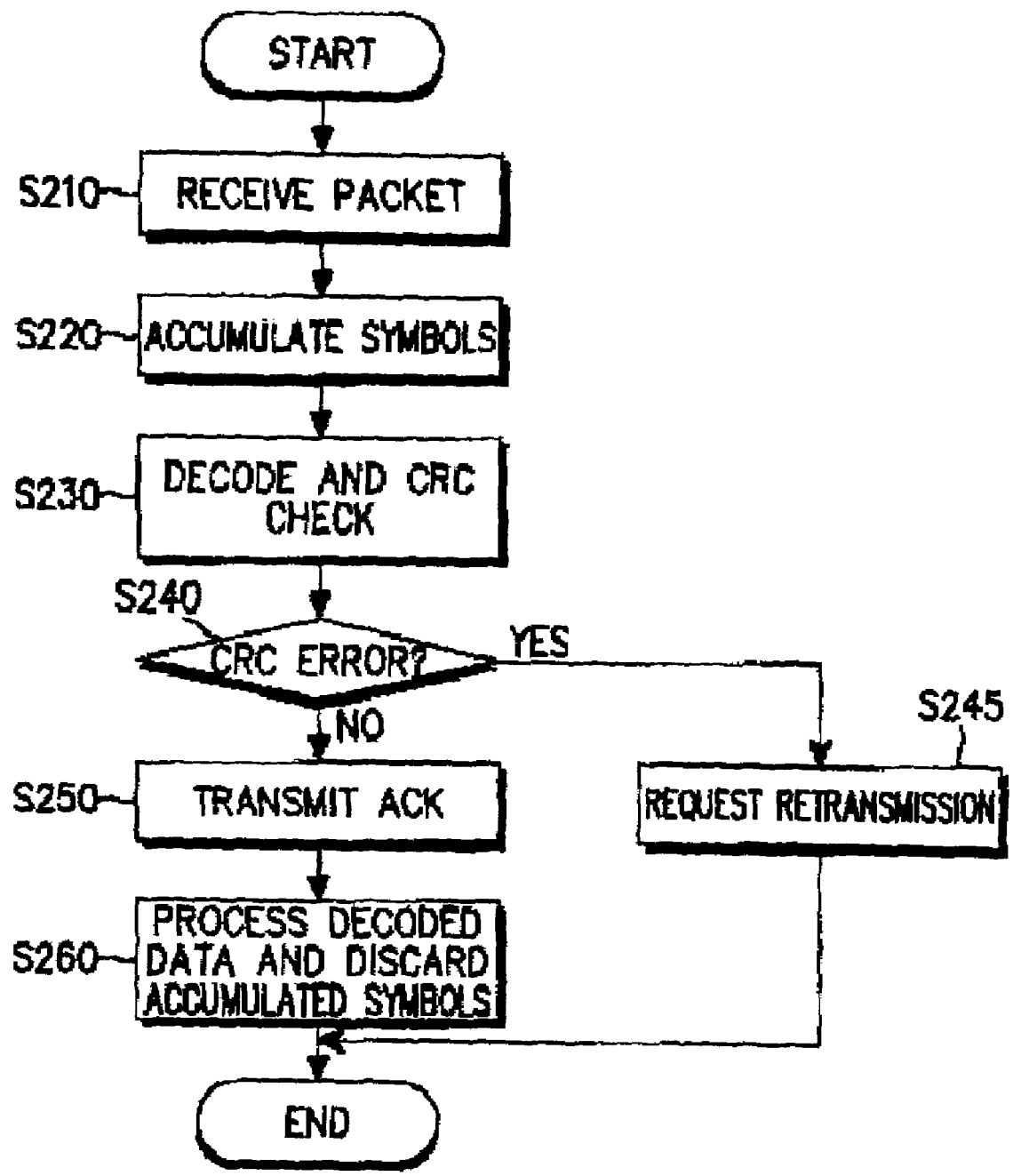
FIG. 4 is a flowchart illustrating a packet retransmission requesting procedure in a conventional hybrid ARQ system.
Figure 5:
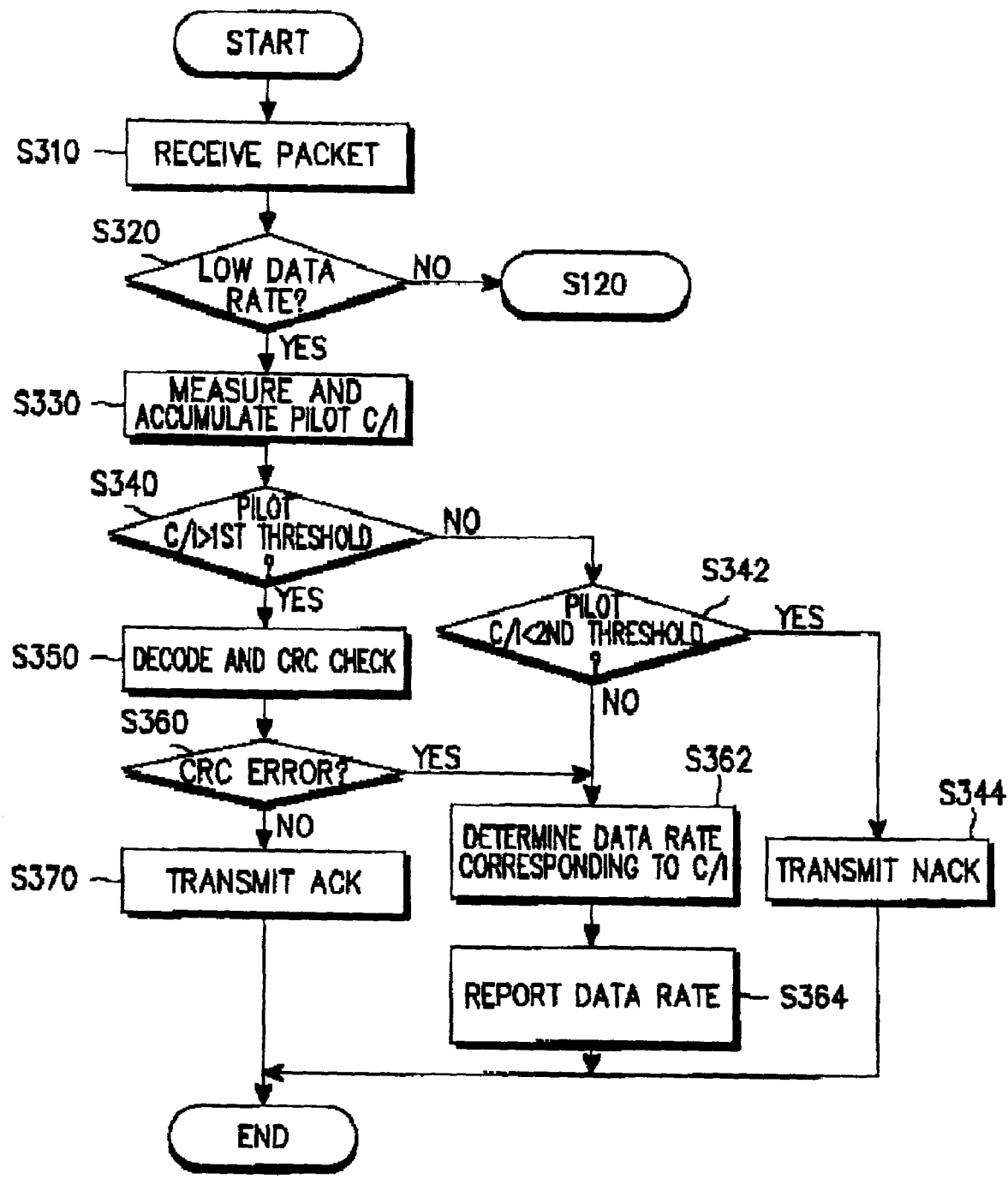
FIG. 5 is a flowchart illustrating a packet transmission control operation in high data rate system according to an embodiment of the present invention.

FIG. 5 is a flowchart illustrating a packet transmission control operation in an HDR system according to an embodiment of the present invention. Referring to FIG. 5, upon receipt of a packet in each slot, an AT analyses the preamble of the packet, checks whether the packet is destined for the AT in step S310. If it is, the AT determines the length of the preamble and checks whether the data rate of the packet is a low data rate in step S320. Here, a low data rate is defined as a data rate at which the same packet is transmitted at least twice. In the case of a high data rate without packet retransmission, the AT measures the pilot C/I of the received packet in step S120 and determines a data rate corresponding to the received C/I in step S130 in the conventional procedure of FIG. 2.

In the case of a low data rate (repeated packet transmission), the AT measures the received C/I of a forward pilot channel or a forward pilot symbol in the time period of the current packet in step S330. If the pilot C/I of the current packet has already been measured, in other words, if the current packet was received previously, the AT calculates the accumulated pilot C/I of the same packets.

In step S340, the AT compares the measured pilot C/I or the accumulated pilot C/I with a predetermined first threshold. The first threshold is the lowest value that ensures a packet error rate below a predetermined value after packet decoding. The first threshold can be calculated by accumulating a C/I corresponding to the data rate of the current packet as many times as the maximum number of packet transmissions. The AT searches for a C/I corresponding to the current data rate in a C/I table listing C/I requirements versus data rates and determines the first threshold utilizing the C/I. Table 1 shown below illustrates C/I values required for data rates, and the resulting first thresholds.

TABLE 1

| Data rate | Required C/I | Packet repetition | First threshold |
|---|---|---|---|
| 38.4 kbps | −12.0 dB | 16 | 0 dB |
| 76.8 kbps | −9.0 dB | 8 | 0 dB |
| 102.4 kbps | −7.8 dB | 6 | 0 dB |
| 153.6 kbps | −6.0 dB | 4 | 0 dB |
| 204.8 kbps | −4.8 dB | 3 | 0 dB |
| 307.2 kbps | −3.0 dB | 2 | 0 dB |
| 614.4 kbps | 0.0 dB | 1 | 0 dB |
| 921.6 kbps | 2.0 dB | 1 | 2 dB |
| 1228.8 kbps | 4.0 dB | 1 | 4 dB |
| 1843.2 kbps | 7.0 dB | 1 | 7 dB |
| 2457.6 kbps | 10.0 dB | 1 | 10 dB |

If the pilot C/I is greater than the first threshold, the AT decodes the current packet and performs an error check in step S350. The error check can be performed in many ways. In the present invention, a CRC error check is performed.

If no errors are found in the CRC check in step S360, the AT transmits an ACK signal to the AN and the packet to an upper layer in step S370. As stated before, the ACK signal indicates that the received packet has no errors. Upon receipt of the ACK signal, the AN discontinues retransmission of the packet and initiates transmission of the next packet. On the other hand, if errors are found in the CRC check in step S360, the AT determines a data rate corresponding to the pilot C/I in step S362 and transmits DRC(Data Rate Control) information indicating the determined data rate to the AN in step S364. Upon receipt of the DRC information, the AN retransmits the packet at the requested data rate.

If the pilot C/I is equal to or less than the first threshold in step S340, the AT compares the pilot C/I with a predetermined second threshold in step S342. The second threshold is a pilot C/I or an accumulated pilot C/I with which packet errors are sure to exist even if the current packet is repeatedly transmitted a total slot number of times.

If the pilot C/I is less than the second threshold, the AT quits decoding and transmits a NACK signal to the AN to discontinue the retransmission of the current packet in step S344. As stated before, the NACK signal indicates that the received packet is abnormal. In this case, the upper layer considers the current packet as an error. Upon receipt of the NACK signal, the AN discontinues the retransmission of the packet, or retransmits the packet from the beginning slot. If the pilot C/I is greater than or equal to the second threshold, the AT determines the data rate corresponding to the pilot C/I in step S362 and transmits the DRC information to the AN in step S364. Upon receipt of the DRC information, the AN retransmits the packet at the requested data rate.

The second threshold is calculated by $$\text{second threshold} = \frac{(\text{required } C/I \times \text{total number of slots for current packet} \div \text{margin}) \times \text{number of slots transmitted for current packet}}{\text{total number of slots for current packet}} \quad (1)$$
$$= (\text{required } C/I \div \text{margin}) \times \text{number of slots transmitted for current packet}$$

or $$\text{second threshold [dB]} = \text{required } C/I[\text{dB}] - \text{margin[dB]} + 10 \times \log_{10}(\text{number of slots transmitted for current packet}) \quad (2)$$

The second threshold is calculated by dividing the required C/I corresponding to a current data rate by a predetermined margin and multiplying the number of already transmitted slots for the current packet. The second threshold varies with the number of transmitted slots. The margin is determined according to the reliability of the second threshold. If the reliability of NACK is to be high, the margin increases and if the reliability of NACK is to be low, the margin drops.

Now there will be given a description of a second threshold when five slots were transmitted at 76.8 kbps. A required C/I is −9.0 dB according to Table 1 and a margin is given as 3.0 dB. The number of slots already transmitted is 10*log(5)=7.0 in dB scale. Then, the second threshold is −9.0 dB−3.0 dB+7.0 dB=−5.0 dB. Table 2 lists second thresholds versus transmitted slot numbers at 76.8 kbps.

TABLE 2

| Number of transmitted slots | Second threshold |
| --- | --- |
| 1 | −12.0 dB |
| 2 | −9.0 dB |
| 3 | −7.2 dB |
| 4 | −6.0 dB |
| 5 | −5.0 dB |
| 6 | −4.2 dB |
| 7 | −3.6 dB |
| 8 | −3.0 dB |

As described above, the AT transmits one of DRC, ACK, and NACK to the AN on the DRC channel according to the pilot C/I comparison result and the CRC check result.

Table 3 illustrates information examples transmitted on the DRC channel according to the embodiment of the present invention.

TABLE 3

| DRC symbol | Information |
| --- | --- |
| 0000 | 38.4 kbps |
| 0001 | 76.8 kbps |
| 0010 | 102.4 kbps |
| 0011 | 153.6 kbps (short) |
| 0100 | 153.6 kbps (long) |
| 0101 | 204.8 kbps |
| 0110 | 307.2 kbps (short) |
| 0111 | 307.2 kbps (long) |
| 1000 | 614.4 kbps |
| 1001 | 921.6 kbps |
| 1010 | 1228.8 kbps |
| 1011 | 1843.2 kbps |
| 1100 | 2457.6 kbps |
| 1101 | ACK |
| 1110 | not used |
| 1111 | NACK |

Referring to Table 3, values 0000 to 1100 of the 4-bit DRC symbol indicate data rates, 1101 indicates ACK, and 1111 indicates NACK. Short and long in Table 3 indicate a short packet and a long packet, respectively.

Figure 6:
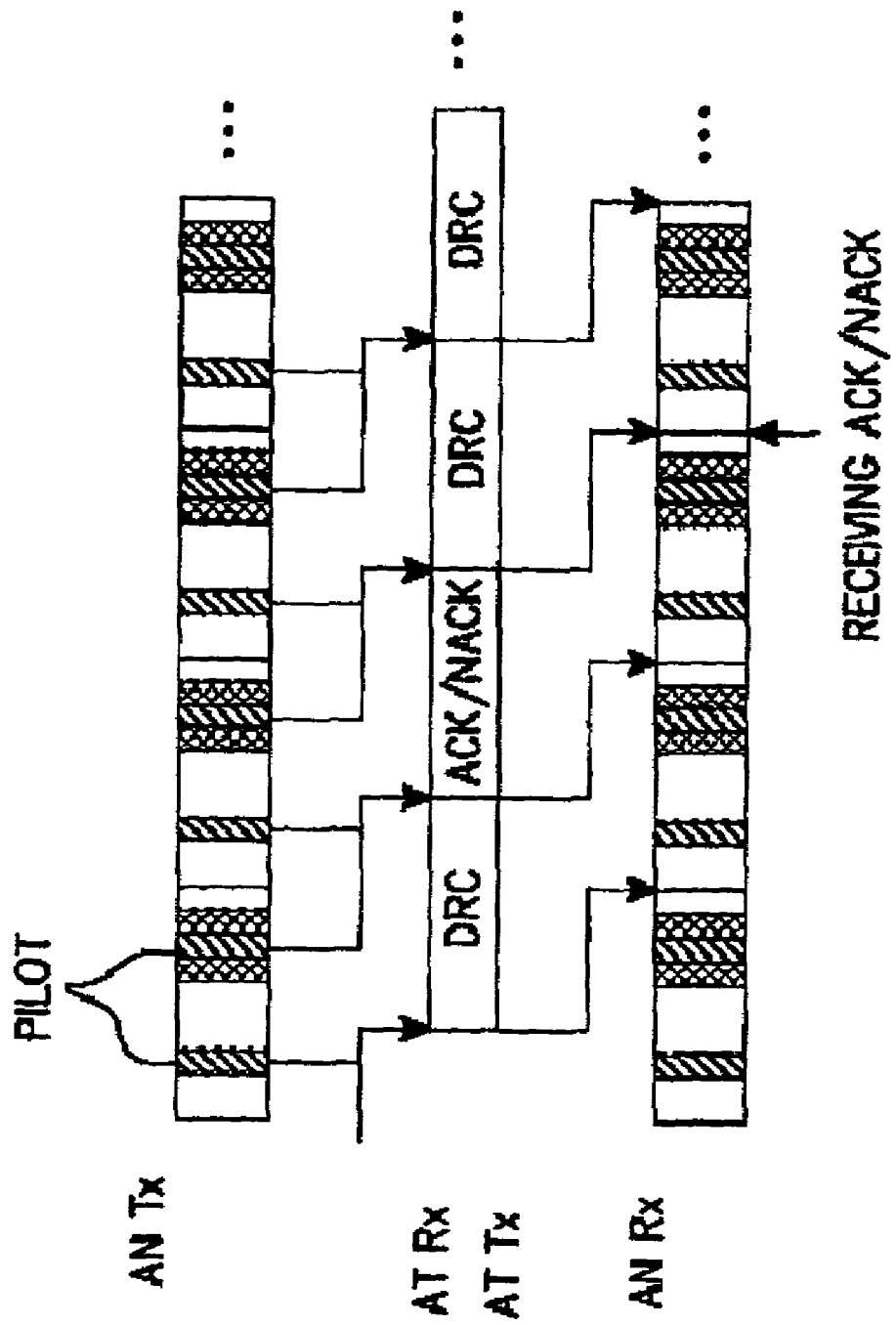
FIG. 6 illustrates high data rate system forward and reverse links according to the embodiment of the present invention.

FIG. 6 illustrates the relationship in slot transmission/reception between the forward link and the reverse link in the HDR system according to the embodiment of the present invention. In FIG. 6, the AN repeatedly transmits a packet in slots on the forward link (AN Tx). Upon receipt of each slot, the AT feeds back one of DRC, ACK, and NACK on the reverse DRC channel (AT Tx).

Figure 7:
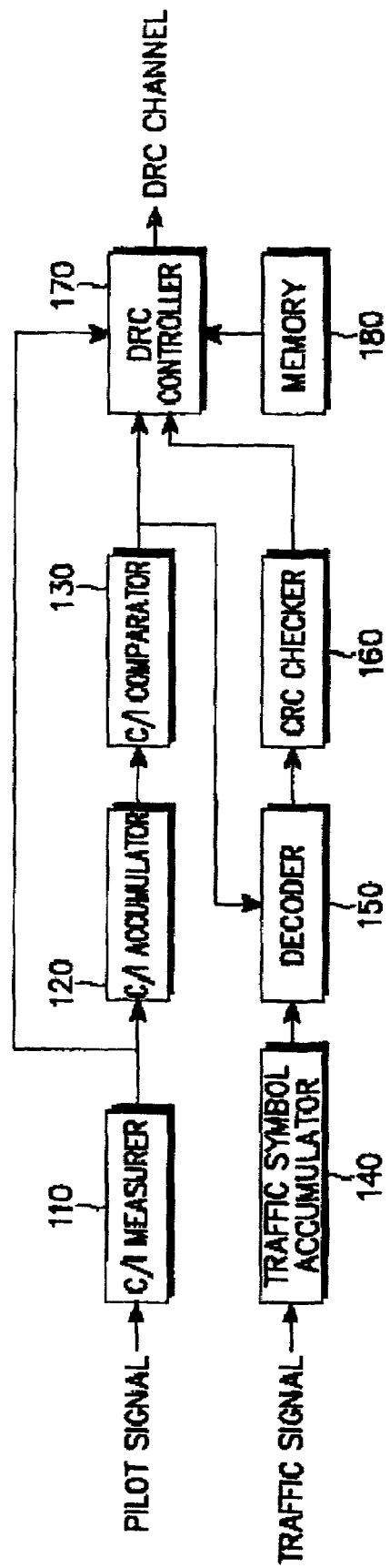
FIG. 7 is a block diagram of a transmitter in high data rate system AT according to the embodiment of the present invention.

FIG. 7 is a block diagram of a transmitter in an HDR AT according to the embodiment of the present invention. Referring to FIG. 7, a C/I measurer 110 measures the C/I of a pilot channel or a pilot symbol received from an AN. A C/I accumulator 120 determines whether the same packet was received previously and accumulates the pilot C/I values of the packets if the same packet exists. A C/I comparator 130 compares the accumulated pilot C/I with a first threshold and a second threshold, respectively and transmits the comparison results to a DRC controller 170. The DRC controller 170 determines a data rate corresponding to the measured pilot C/I and generates a DRC symbol representative of the data rate.

A traffic symbol accumulator 140 accumulates the traffic symbols of the same packets and a decoder 150 decodes the accumulated traffic symbols only if the accumulated pilot C/I is greater than the first threshold. A CRC checker 160 performs a CRC check on the decoded traffic symbols and transmits the check result to the DRC controller 170.

The DRC controller 170 selects one of ACK, NACK, and a DRC symbol from a memory 180 based on the C/I comparison results and CRC check result and transmits the selected signal on a reverse DRC channel. The memory 180 stores information shown in Table 1 to be transmitted on the DRC channel.

Modifications can be made to the above embodiment of the present invention. For example, if the accuracy of received C/I measurement (i.e., received C/I measurement) is maintained within a predetermined range, the ACK signal can be transmitted directly without the CRC check. That is, the AT compares the received C/I of a forward pilot signal with the first threshold in step S340 and if the received C/I is greater than the first threshold, it transmits the ACK signal directly to the AN in step S370, as shown in FIG. 5.

It can be further contemplated that if the received C/I is equal to or less than the first threshold in step S340, it jumps to steps S362 and S364 and requests packet retransmission to the AN.

The AT can compare the received C/I with the second threshold in step S342 before comparing it with the first threshold and if the received C/I is less than the second threshold, the AT can transmit the NACK signal directly to the AN in step S344.

Figure 8:
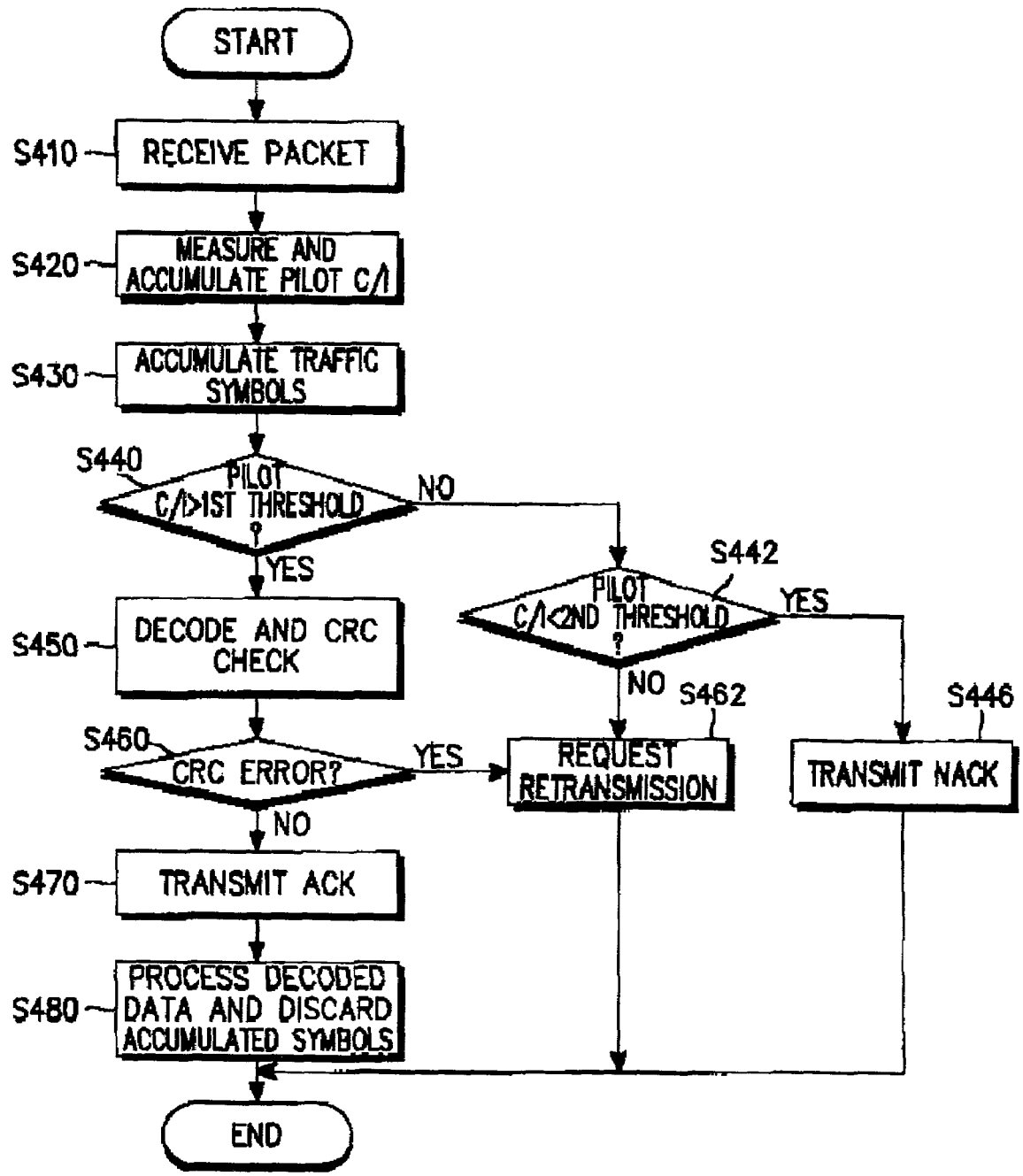
FIG. 8 is a flowchart illustrating a packet transmission control operation in a hybrid ARQ system according to another embodiment of the present invention.

FIG. 8 is a flowchart illustrating a packet retransmission requesting procedure in a hybrid ARQ system according to another embodiment of the present invention. Referring to FIG. 8, upon receipt of a packet from an AN in step S410, an AT measures the C/I of a pilot channel in the time period when the packet is transmitted (hereinafter, referred to as the current packet period). If the measured pilot C/I of the same packet exists, the AT accumulates the pilot C/I of the current packet to the existing pilot C/I in step S420. In step S430, if the same packet was received previously, the AT accumulates the traffic symbols of the same packets in steps S430. In the case of non-hybrid ARQ, the traffic symbols are not accumulated in step S430.

The AT compares the pilot C/I measurement or the accumulated pilot C/I with a predetermined first threshold in step S440. The first threshold is calculated by accumulating a C/I corresponding to the data rate of the current packet as many times as the number of packet occurrences. If the pilot C/I is greater than the first threshold, the AT decodes the accumulated traffic symbols and performs a CRC check on the decoded traffic symbols in step S450.

If no errors are found in the CRC check in step S460, the AT feeds back the ACK signal to the AN so that the AN discontinues retransmission of the current packet in step S470. The AT transmits the current packet to an upper layer and discards the decoded data and the pilot C/I in step S480. If errors are found in the CRC check in step S460, the AT transmits a signal requesting retransmission of the current packet to the AN in step S462.

On the other hand, if the pilot C/I is equal to or less than the first threshold, the AT compares the pilot C/I with a predetermined second threshold in step S442. The second threshold is a value at which packet errors are sure to be generated even if the current packet is transmitted as many times as allowed for the packet. The second threshold varies with the number of packet occurrences. In the ARQ system, the second threshold is calculated by dividing a required C/I corresponding to the current data rate by a predetermined margin, and multiplying the number of occurrence of the current packet, as in Eq (1).

If the pilot C/I is less than the second threshold, the AT transmits the NACK signal to the AN in step S446. Upon receipt of the NACK signal, the AN initiates transmitting the packet from the beginning slot, or gives up retransmission of the packet and allocates the resources assigned for the packet to another user. If the pilot C/I is greater than or equal to the second threshold, the AT transmits the signal requesting retransmission of the packet to the AN in step S462.

In the second embodiment of the present invention as described above, if the received pilot C/I is greater than the first threshold and CRC errors are found, and if the received pilot C/I is equal to or less than the first threshold and greater than a second threshold, the AT transmits the retransmission request signal to the AN.

Similarly to the first embodiment of the present invention, modifications can be made to the second embodiment. If the accuracy of received C/I measurement is maintained within a predetermined range, the ACK signal can be transmitted directly without the CRC check. The AT compares the received C/I of a forward pilot signal with the first threshold in step S440 and if the received C/I is greater than the first threshold, it transmits the ACK signal directly to the AN in step S470.

If the received C/I is equal to or less than the first threshold in step S440, it jumps to step S462 and requests packet retransmission to the AN.

The AT can compare the received C/I with the second threshold in step 442 before comparing it with the first threshold and if the received C/I is less than the second threshold, the AT can transmit the NACK signal directly to the AN in step S446.

The present invention has the following advantages: (1) unnecessary decoding and CRC check can be omitted by performing decoding and a CRC check according to a received C/I measurement in both a link adaptation system and an ARQ system. Therefore, channel throughput is increased, the power required for decoding is reduced, and the decrease of feedback time reduces the required capacity of a memory in a transmitter; and (2) unnecessary packet retransmission is prevented by estimating reception link conditions and transmitting the ACK or NACK signal according to the received C/I measurement.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of controlling transmission of a data packet from an access network (AN) in an access terminal (AT) of a mobile telecommunication system where the AN transmits the data packet in successive time slots, each slot having a plurality of data bits, and the AT receives the data packet from the AN, the method comprising the steps of:
    comparing a received C/I of a forward pilot signal received from the AN with a predetermined first threshold;
    selectively checking for errors in the data packet in a received time slot according to whether the received C/I is greater than the first threshold; and
    transmitting a signal requesting termination of retransmission of the data packet to the AN if no errors are found in the data packet after said checking.

2. The method of claim 1, further comprising the steps of:
    determining whether it is a low data rate using a length of a preamble of the received data packet; and
    proceeding further with the comparison step if the determined data rate is the low data rate, wherein the low data rate repeatedly transmits the same packet two times or more.

3. The method of claim 1, further comprising the steps of:
    determining a data rate corresponding to the received C/I if errors are found in the data packet in the error check; and
    requesting retransmission of the data packet by transmitting the determined data rate to the AN.

4. The method of claim 1, further comprising the steps of:
    determining a data rate corresponding to the received C/I if the received C/I is equal to or less than the first threshold; and
    requesting retransmission of the data packet by transmitting the determined data rate to the AN.

5. The method of claim 1, further comprising the steps of:
    comparing the received C/I with a predetermined second threshold if the received C/I is equal to or less than the first threshold; and transmitting the signal requesting termination of retransmission of the data packet to the AN if the received C/I is less than the second threshold.

6. The method of claim 5, further comprising the steps of:
determining the data rate corresponding to the received C/I if the received C/I is equal to or greater than the second threshold; and
requesting retransmission of the data packet by transmitting the determined data rate to the AN.

7. The method of any of claims 1, 4 or 5, wherein the first threshold is calculated by accumulating a C/I corresponding to the data rate of the current data packet as many times as the maximum number of the data packet transmissions.

8. The method as claimed in either of claims 5 or 6, wherein the second threshold is calculated by dividing the received C/I corresponding to a current data rate by a predetermined margin and multiplying the number of already transmitted slots for the current data packet.

9. A method of controlling transmission of a data packet from an access network (AN) in an access terminal (AT) of a mobile telecommunication system where the AN transmits the data packet in successive time slots each having a plurality of data bits and the AT receives the data packet from the AN, the method comprising the steps of:
comparing a received C/I of a forward pilot signal received from the AN with a predetermined first threshold;
selectively checking for errors in the data packet according to whether the received C/I is greater than the first threshold; and
transmitting a signal requesting termination of retransmission of the data packet to the AN if the received C/I is greater than the first threshold.

10. The method of claim 9, further comprising the steps of:
determining whether it is a low data rate using a length of a preamble of the received data packet; and
proceeding further with the comparison step if the determined data rate is the low data rate, wherein the low data rate repeatedly transmits the same packet two times or more.

11. The method of claim 9, further comprising the steps of:
determining a data rate corresponding to the received C/I if the received C/I is equal to or less than the first threshold; and
requesting retransmission of the data packet by transmitting the determined data rate to the AN.

12. The method of claim 11, further comprising the steps of:
comparing the received C/I with a predetermined second threshold if the received C/I is equal to or less than the first threshold; and
transmitting the signal requesting termination of retransmission of the data packet to the AN if the received C/I is less than the second threshold.

13. The method of claim 12, further comprising the steps of:
determining the data rate corresponding to the received C/I if the received C/I is equal to or greater than the second threshold; and
requesting retransmission of the data packet by transmitting the determined data rate to the AN.

14. The method of any of claims 9 to 13, wherein the first threshold can be calculated by accumulating a C/I corresponding to the data rate of the current data packet as many times as the maximum number of data packet transmissions.

15. The method as claimed in either of claims 12 or 13, wherein the second threshold is calculated by dividing the received C/I corresponding to a current data rate by a predetermined margin and multiplying the number of already transmitted slots for the current data packet.

16. A method of controlling transmission of a data packet from an access network (AN) in an access terminal (AT) of a mobile telecommunication system where the AN transmits the data packet in successive time slots each having a plurality of data bits and the AT receives the data packet from the AN, the method comprising the steps of:
comparing a received C/I of a forward pilot signal received from the AN with a predetermined first threshold;
selectively checking for errors in the data packet according to whether the received C/I is greater than the first threshold;
determining a data rate corresponding to the received C/I if the received C/I is less than or equal to the first threshold; and
requesting retransmission of the data packet to the AN by transmitting the determined data rate to the AN.

17. The method of claim 16, further comprising the steps of:
determining whether it is a low data rate using a length of a preamble of the received data packet; and
proceeding further with the comparison step if the determined data rate is the low data rate, wherein the low data rate repeatedly transmits the same data packet two times or more.

18. The method of claim 16, further comprising the steps of:
comparing the received C/I with a predetermined second threshold if the received C/I is equal to or less than the first threshold;
determining the data rate corresponding to the received C/I if the received C/I is equal to or greater than the second threshold; and
requesting retransmission of the data packet by transmitting the determined data rate to the AN.

19. The method of any of claims 16 to 18, wherein the first threshold is calculated by accumulating a C/I corresponding to the data rate of the current data packet as many times as the maximum number of data packet transmissions.

20. The method of claim 18, wherein the second threshold is calculated by dividing the received C/I corresponding to a current data rate by a predetermined margin and multiplying the number of already transmitted slots for the current data packet.

21. An apparatus for controlling transmission of a data packet from an access network (AN) in an access terminal (AT) of a mobile telecommunication system where the AN transmits the data packet in successive time slots each having a plurality of data bits and the AT receives the data packet from the AN, the apparatus comprising:
a device for comparing a C/I of a forward pilot signal received from the AN with a predetermined first threshold;
a device for decoding a data packet in a received time slot and selectively checking for errors in the decoded data packet according to whether the received C/I is greater than the first threshold; and
a device for transmitting a signal requesting termination of retransmission of the data packet to the AN if no errors are found in the data packet.

22. The apparatus of claim 21, wherein the comparator detects the length of the data preamble of the received time slot, determines whether that is the low data rate and performs the comparison if the determined data rate is a low data rate, wherein the low data rate repeatedly transmits the same data packet two times or more.

23. The apparatus of claim 21, further comprising:
a device for determining a data rate corresponding to the received C/I if errors are found in the decoded data packet; and
a device for requesting retransmission of the data packet by transmitting the determined data rate to the AN.

24. The apparatus of claim 23, further comprising:
a device for determining a data rate corresponding to the received C/I if the received C/I is equal to or less than the first threshold; and
a device for requesting retransmission of the data packet by transmitting the determined data rate to the AN.

25. The apparatus of claim 23, further comprising:
a device for comparing the received C/I with a predetermined second threshold if the received C/I is equal to or less than the first threshold; and
a device for transmitting the signal requesting termination of retransmission of the data packet to the AN if the received C/I is less than the second threshold.

26. The apparatus of claim 25, further comprising:
a device for determining the data rate corresponding to the received C/I if the received C/I is equal to or greater than the second threshold; and
a device for requesting retransmission of the data packet by transmitting the determined data rate to the AN.

27. The apparatus of any of claims 21 to 26, wherein the first threshold is calculated by accumulating a C/I corresponding to the data rate of the current data packet as many times as the maximum number of data packet transmissions.

28. The apparatus as claimed in either of claims 25 or 26, wherein the second threshold is calculated by dividing the received C/I corresponding to a current data rate by a predetermined margin and multiplying the number of already transmitted slots for the current data packet.

29. An apparatus for controlling transmission of a data packet from an access network (AN) in an access terminal (AT) of a mobile telecommunication system where the AN transmits the data packet in successive time slots each having a plurality of data bits and the AT receives the data packet from the AN, the apparatus comprising:
a device for comparing a received C/I of a forward pilot signal received from the AN with a predetermined first threshold;
a device for selectively checking for errors in the data packet according to whether the received C/I is greater than the first threshold; and
a device for transmitting a signal requesting termination of retransmission of the data packet to the AN if the received C/I is greater than the first threshold.

30. The apparatus of claim 29, wherein the comparator detects the length of the data preamble of the received time slot, determines whether that is the low data rate and performs the comparison if the determined data rate is a low data rate, wherein the low data rate repeatedly transmits the same data packet two times or more.

31. The apparatus of claim 29, further comprising:
a device for determining a data rate corresponding to the received C/I if the received C/I is equal to or less than the first threshold; and
a device for requesting retransmission of the data packet by transmitting the determined data rate to the AN.

32. The apparatus of claim 29, further comprising:
a device for comparing the received C/I with a predetermined second threshold if the received C/I is equal to or less than the first threshold; and
a device for transmitting the signal requesting termination of retransmission of the data packet to the AN if the received C/I is less than the second threshold.

33. The apparatus of claim 32, further comprising:
a device for determining a data rate corresponding to the received C/I if the received C/I is equal to or greater than the second threshold; and
a device for requesting retransmission of the data packet by transmitting the determined data rate to the AN.

34. The apparatus of any of claims 29 to 33, wherein the first threshold is calculated by accumulating a C/I corresponding to the data rate of the current data packet as many times as the maximum number of data packet transmissions.

35. The apparatus as claimed in either of claims 32 or 33, wherein the second threshold is calculated by dividing the received C/I corresponding to a current data rate by a predetermined margin and multiplying the number of already transmitted slots for the current data packet.

36. An apparatus for controlling transmission of a data packet from an access network (AN) in an access terminal (AT) of a mobile telecommunication system where the AN transmits the data packet in successive time slots each having a plurality of data bits and the AT receives the data packet from the AN, the apparatus comprising:
a device for comparing a received C/I of a forward pilot signal received from the AN with a predetermined first threshold;
a device for selectively checking for errors in the data packet according to whether the received C/I is greater than the first threshold;
a device for determining a data rate corresponding to the received C/I if the received C/I is less than or equal to the first threshold; and
a device for requesting retransmission of the data packet to the AN by transmitting the determined data rate to the AN.

37. The apparatus of claim 36, wherein the comparator detects the length of the data preamble of the received time slot, determines whether that is the low data rate and performs the comparison if the determined data rate is a low data rate, wherein the low data rate repeatedly transmits the same data packet two times or more.

38. The apparatus of claim 36, further comprising:
a device for comparing the received C/I with a predetermined second threshold if the received C/I is equal to or less than the first threshold;
a device for determining the data rate corresponding to the received C/I if the received C/I is equal to or greater than the second threshold; and
a device for requesting retransmission of the data packet by transmitting the determined data rate to the AN.

39. The apparatus of any of claims 36 to 38, wherein the first threshold is calculated by accumulating a C/I corresponding to the data rate of the current data packet as many times as the maximum number of data packet transmissions.

40. The apparatus of claim 38, wherein the second threshold is calculated by dividing the received C/I corresponding to a current data rate by a predetermined margin and multiplying the number of already transmitted slots for the current data packet.

* * * * *